3,510,314
METHOD OF PREPARING A BANANA
CHIP PRODUCT
Robert F. Lima and Joan Millares Lima, both of
159—34 Riverside Drive, W., New York, N.Y.
10032
No Drawing. Filed July 28, 1966, Ser. No. 568,679
Int. Cl. A23l 1/00
U.S. Cl. 99—100        5 Claims

ABSTRACT OF THE DISCLOSURE

Preparing banana chips in very thin wafer form in which unpeeled, unripe bananas are cross-sliced in very thin slices, of the order of about 1/64 to 1/32 of an inch, by deep-fat frying the slices in oil at about 375° F. until golden brown in color, deoiling and drying the crisp chips.

---

The present invention relates to a method of preparing a banana chip product and is particularly concerned with an improvement of preparing a banana chip product in thin wafer form. The term "banana" as used herein encompasses within the scope of the meaning thereof the different types of Eumusa, including the "Horn Banana" commonly known as "plantain."

Bananas are recognized as a valuable article of diet. In addition to being rich in vitamins A, B1, C and G they are high in minerals and caloric content. It has been reliably determined that far more of the vitamins, minerals and proteins of the banana fruit are contained in the peel than in the pulp, and that this nutritional content of the peel is much greater in the unripe fruit than when it is in the ripe stage.

The tissue of the peel of a banana consists of the epidermis or thin outer skin, the parenchyma which lies immediately beneath the epidermis and makes up the main bulk of the peel, and fibrovascular bundles consisting of fibers and conducting cells which in the unripe fruit bind the peel to the pulp in a manner that prevents them from being cleanly separable unlike the ready separation that is characteristic of the ripe fruit. A large percentage of the nutritional values of an unripe banana are concentrated in the parenchyma of the peel, to be appreciably absorbed in the pulp during the ripening process. It is extremely difficult to remove the peel from the pulp of the unripe fruit with any degree of accuracy even when skilled manual labor is employed for this purpose. Removal and discard of the peel from an unripe banana causes a loss of about half of the vitamins, proteins and minerals contents of the fruit.

It is an object of the present invention to provide a unique method of preparing a deep fat fried banana chip or wafer product of improved quality and appearance from unripe bananas which conserves the great nutritive values of the whole fruit while economically avoiding the difficulties of and losses atendant upon peel removal.

Another object of the invention is to carry out such a method which readily and economically produces such a chip or wafer product in unusual form so that a mass thereof is loose and occupies an unusually large amount of packaging space to please the consumer who desires to obtain for the cost to him of an impressively large quantity of a product, and the individual wafer units of which are very tasty and uniquely attractive in shape and color while being unusually high in nutritional value.

Other objects of the invention will in part be obvious and will in part appear from reference to the following detailed description, and the invention comprises the several steps and the relation of one or more of such steps with respect to each of the others thereof as are exemplified in the method hereinafter described.

Prior to the present invention banana chips have been made from peeled unripe bananas. This has been accomplished by laboriously removing as much of the peel as is possible by skilled manual labor to uncover the stick of the pulp, cross-slicing the pulp stick to form relatively thick slices which are in thickness of the order of about one-sixteenth of an inch to three thirty-seconds of an inch (1/16″–3/32″), and then deep fat frying such pulp slices in a hot bath of edible vegetable oil to convert them into relatively flat, thick and brittle golden disks. By this procedure about a two inch (2″) section of a particular pulp stick that was about one and five-eighths inches (1 5/8″) in diameter and prepared by peeling an unripe banana, has been found after so cross-slicing to produce about three dozen (3 doz.) thick slices of that diameter, which, after deep fat frying, deboiling and cooling, are about one and one-half inches (1½″) in diameter and nearly one-sixteenth of an inch (1/16″) thick. These slices were fried in pure cottonseed oil at a temperature of about 375° F. and for a period of about three (3) minutes to obtain the necessary degree of cooking and the development of the desired golden color. When these golden, relatively flat disk chips were stacked they occupied a generally cylindrical space about four and one-half inches (4½″) long having a cubic capacity of about one and three-quarters cubic inches (1¾ cu. in.).

In accordance with the teachings of the present invention the new banana chip or wafer product may be produced in the following manner. Whole unripe bananas are carefully cleaned, such as by washing and scrubbing, and then are inspected for undesirable spots in the peel. Such undesirable localized areas, if existent, are removed and each cleaned whole unripe banana, with the peel including almost all of its epidermis remaining thereon, is then very thinly cross-sliced to form successive slices each appreciably less than one-sixteenth of an inch (1/16″) in thickness. Such slice thickness may be in the range of about one sixty-fourth of an inch to about one thirty-second of an inch (1/64″–1/32″). Each slice consists of a very thin disk of the pulp margined by a rim of the peel including its epidermis.

These slices are then deep fat fried in suitable edible vegetable oil, such as cottonseed oil or peanut oil, and the like. Frying of the slices in the hot oil bath is conducted until they are converted to individual paper-thin wafers, with the pulp disk of each being a golden transparency in color and with the surrounding rim being quite narrow and curled up appreciably and of a medium brown transparency in color. Many of these paper-thin wafers are tricorn in shape while others form open-sided curls and some are of differently warped shapes, with the curling of all being of appreciable depth. After the paper-thin wafers are removed from the hot oil bath they are deoiled, i.e., the excess oil removed such as by draining or centrifuging, then cooled to the environmental temperature of the surrounding atmosphere and finally conventionally packaged.

For comparative purposes this invention was practiced by selecting a section of a banana of dimensions similar to those of the banana from which the flat thick chips were produced in accordance with the prior conventional procedure described above. After cleaning the whole unripe banana a section thereof about one inch (1″) in length was very thinly cross-sliced to produced about three (3) dozen slices with each in the form of a very thin disk of the pulp margined by a rim of the peel including its epidermis. These thin slices were placed in a 375° F. bath of pure edible cottonseed oil for about one (1) minute to convert them to individual paper-thin wafers with the pulp disk of each being a golden transparency in color and with the surrounding narrow rim being curled up appreciably and of a medium brown transparency in color. These curled paper-thin wafers were then drained of excess oil and cooled to the environmental temperature. The bulk of the so-produced paper-thin wafers occupied a space about five and one-half inches (5½″) long, three inches (3″) wide and one and one-half inches (1½″) deep having a cubic capacity of about twenty-four and three-quarters cubic inches (24¾ cu. in.).

It will thus be seen that the wafer product of the present invention made from one-half of the quantity of the unripe bananas used to produce the peeled prior art chip product occupied about fourteen (14) times the space occupied by the conventional product. In other words, the chip or wafer product produced by the present invention was about twenty-eight (28) times more bulky as to space occupancy in a package than was the product produced by the prior conventional procedure. It is a superior product also because the nutritional values of the peel have been retained and it is more attractive in appearance by virtue of the curled shapes of the wafers and the contrasting golden transparency color of the pulp disk of each wafer and the darker medium brown transparency color of the surrounding curled narrow rim.

In conducting the comparative tests the prior conventional procedure was repeated except that an unpeeled and unripe banana was used, the cross-slicing thereof being of the same type employed to produce the peeled slices of thicknesses of the order of about one-sixteenth to about three thirty-seconds of an inch (1/16″–3/32″). These relatively thick slices were then deep fat fried in the same type of pure edible cottonseed oil at about 375° F. for about the same period of time of three (3) minutes. The resulting chips were found to be rather uniformly curled at the edges to form relatively shallow concave or saucer-shaped chips, each margined by a wide rim that was dark brown in color, and with the central pulp disk thereof being of a golden color similar to that of the peeled unripe banana. Due to the dark brown of the wide rim of these chips they were found to be unappetizing in appearance. While the nutritional values were preserved by this procedure, the resulting product was found to be undesirable both as to bulk and appearance. It is thus obvious that the very thin cross-slicing of the cleaned whole unripe bananas, without removal of the peel therefrom and while at least most of the epidermis of the latter remains thereon, is very important to the production of the superior product produced by the practice of the method of the present invention.

Tests have also been made with regard to thinly cross-slicing the peeled unripe bananas. It has been found that when the peeled unripe bananas are cross-sliced to produce slices of a thickness in the range of that of the slices produced in accordance with the present invention, many of these thin peeled slices break up into small fragments in the cutting procedure and that most of those which survived the thin cross-slicing or were broken up by the latter into a few large fragments were disintegrated into small fragments in the following deep fat frying. Thus the retention of the peel is of considerable importance to the very thin cross-slicing of the present method for the successful production of the attractive product resulting from the practice of the present invention.

If the banana chip or wafer product of the present invention is to be used as a snack item the wafers may be salted in the usual manner. The present chip or wafer product has also proven to be desirable as a flake product, which may be used in the conventional manner of use of breakfast cereal flakes.

While the chip or wafer product of the present invention has a distinctive and pleasing banana flavor, if desired, ripe banana flavoring material, either in natural form derived from the ripe fruit or of an artificial or synthetic type, may be added. This may be accomplished by adding any such banana flavoring material to the edible oil in which the slices are to be deep fat fried, or such flavoring material may be applied to the hot fried chips as they are removed from the hot oil bath, such as by sprinkling the chips therewith, so as to enhance the natural banana flavor inherently present.

It will thus be seen that the objects set forth above, among those made apparent from the preceding description, are efficiently attained and, since certain changes may be made in carrying out the above method without departing from the scope of the invention, it is intended that all matter containing in the above description shall be interpreted as illustrative and not in a limiting sense.

Having described our invention, what we claim as new and desire to secure by Letters Patent is:

1. A method of preparing a banana chip or wafer product comprising the steps of very thinly cross-slicing cleaned whole unripe bananas, without removal of the peel therefrom and while the epidermis of the latter remains thereon, to form successive slices each appreciably less than one-sixteenth of an inch (1/16″) in thickness and consisting of a very thin disk of the pulp margined by a rim of the peel including its epidermis, and deep fat frying said slices in a hot oil bath until they are converted to individual paper-thin wafers with the pulp disk of each being a golden transparency in color and with the surrounding rim being relatively narrow, curled up appreciably and of a medium brown transparency in color.

2. The method of claim 1 characterized by said step of very thinly cross-slicing the whole unripe bananas being of a character as to form each of the successive slices in a thickness in the range of about one sixty-fourth to about one thirty-second of an inch (1/64″–1/32″).

3. The method of claim 2 chracterized by deep fat frying said unripe banana slices in a bath of edible vegetable oil at a temperature of the order of about 375° F. for a period of about one (1) minute.

4. The method of claim 3 characterized by the additional steps of removing the fried slices from the frying bath, separating therefrom excess oil of the bath, cooling the resulting deoiled wafers to the environmental temperature, and packaging the cooled wafers.

5. The method of claim 1 characterized by the additional step of adding ripe banana flavoring material to the oil bath before deep fat frying the unripe slices therein to cause flavor of such material to permeate the fried slices.

References Cited

UNITED STATES PATENTS

| Re. 20,040 | 1/1936 | Romney | 99—100 |
| 1,090,255 | 3/1914 | Walsh | 99—100 |
| 2,056,884 | 10/1936 | Brunstetter | 99—100 |

OTHER REFERENCES

Lord: Everybody's Cookbook, Harcort, Brace and Co., New York, 1937, p. 401.

RAYMOND N. JONES, Primary Examiner

J. M. HUNTER, Assistant Examiner

U.S. Cl. X.R.

99—171